(12) United States Patent
Hoeger et al.

(10) Patent No.: US 10,960,484 B2
(45) Date of Patent: Mar. 30, 2021

(54) DEVICE FOR PROVIDING A LAMINAR FLOW OF SHIELDING GAS IN A WELDING DEVICE

(71) Applicant: Illinois Tool Works Inc., Glenview, IL (US)

(72) Inventors: Michael Hoeger, Appleton, WI (US); Zachary Erndt, Sherwood, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 447 days.

(21) Appl. No.: 15/676,065

(22) Filed: Aug. 14, 2017

(65) Prior Publication Data

US 2018/0043457 A1 Feb. 15, 2018

Related U.S. Application Data

(60) Provisional application No. 62/375,021, filed on Aug. 15, 2016, provisional application No. 62/418,923, filed on Nov. 8, 2016.

(51) Int. Cl.
| | |
|---|---|
| *B23K 9/32* | (2006.01) |
| *B23K 26/14* | (2014.01) |
| *B23K 9/167* | (2006.01) |
| *B23K 9/16* | (2006.01) |
| *B23K 10/02* | (2006.01) |
| *B23K 26/21* | (2014.01) |

(52) U.S. Cl.
CPC ............... *B23K 9/325* (2013.01); *B23K 9/16* (2013.01); *B23K 9/164* (2013.01); *B23K 9/167* (2013.01); *B23K 10/02* (2013.01); *B23K 26/14* (2013.01); *B23K 26/1464* (2013.01); *B23K 26/21* (2015.10)

(58) Field of Classification Search
CPC ........ B23K 9/325; B23K 9/164; B23K 26/21; B23K 9/167
USPC ............... 219/74, 75, 121.11, 121.85, 137 R
See application file for complete search history.

(56) References Cited

U.S. PATENT DOCUMENTS

| | | | | |
|---|---|---|---|---|
| 3,053,967 A | * | 9/1962 | Gorman | B23K 9/167 219/74 |
| 3,053,968 A | * | 9/1962 | Gorman | B23K 9/167 219/74 |

(Continued)

FOREIGN PATENT DOCUMENTS

| | | |
|---|---|---|
| JP | 3591058 | 11/2004 |
| JP | 2016030264 | 3/2016 |

OTHER PUBLICATIONS

International Search Report and Written Opinion for PCT/US2017/046867, dated Nov. 23, 2017. (13 pages).

*Primary Examiner* — Thien S Tran
(74) *Attorney, Agent, or Firm* — McAndrews, Held & Malloy, Ltd.

(57) ABSTRACT

The present disclosure is directed to a component of a welding device that is configured to produce a shielding gas having a developed flow profile, which provides for a shielding gas column having a laminar profile over a greater length than has been achieved through conventional means. The component utilizes one or more flow restrictors, which are configured to provide higher resistance to the flow of shielding gas at increasing distances from the center of a shielding gas flow channel. By providing increasing resistance toward the periphery of the channel, a developed shielding gas flow profile may be achieved over a relatively short flow length.

24 Claims, 8 Drawing Sheets

(56) References Cited

U.S. PATENT DOCUMENTS

| | | | | |
|---|---|---|---|---|
| 3,125,666 A * | 3/1964 | Gorman | ............... | B23K 9/164 |
| | | | | 219/74 |
| 3,875,364 A * | 4/1975 | Boyett | ............... | B23K 9/167 |
| | | | | 219/74 |
| 5,393,949 A * | 2/1995 | Stricklen | ............... | B23K 9/167 |
| | | | | 219/74 |
| 5,609,781 A | 3/1997 | Kaga et al. | | |
| 6,161,780 A | 12/2000 | Sugimoto et al. | | |
| 6,622,944 B1 * | 9/2003 | Hurley | ............... | F23D 11/102 |
| | | | | 239/426 |
| 9,338,873 B1 * | 5/2016 | Furick | ............... | B23K 9/296 |
| 2002/0017504 A1 | 2/2002 | Toyoda et al. | | |
| 2013/0313229 A1 * | 11/2013 | Comon | ............... | B23K 9/16 |
| | | | | 219/74 |

* cited by examiner

DEVICE FOR PROVIDING A LAMINAR FLOW OF SHIELDING GAS IN A WELDING DEVICE

The present application claims priority to U.S. Provisional Patent Application No. 62/375,021, filed Aug. 15, 2016, and U.S. Provisional Patent Application No. 62/418,923, filed Nov. 8, 2016, the entire contents of each of which are incorporated herein by reference.

BACKGROUND OF THE INVENTION

Shielding gas plays an important role in producing a quality weld. Specifically, the shielding gas prevents, or shields, the weld from atmospheric oxygen, which causes oxidation, and other atmospheric contaminants. Accordingly, maintaining a desirable flow of shielding gas through a welding device is important to ensure that a quality weld can be produced. For example, it is desirable that the column of shielding gas exiting the gas outlet (e.g. nozzle) of the welding device has a laminar, as opposed to turbulent, flow profile because a laminar flow profile introduces less undesirable reactive gases from the atmosphere into the inert gas column shielding the weld area.

Because of the difference in velocity between the shielding gas and the atmosphere around the periphery of the shielding gas column, however, Kelvin-Helmholtz instabilities occur at the outer edges of the shielding gas column. These instabilities begin at wavelike motion and grow until the flow of the shielding gas becomes fully turbulent at a distance from the gas outlet. The distance over which the shielding gas column maintains a substantially laminar flow profile depends on a number of factors, including the flow rate of the shielding gas, the cross-sectional size of the gas outlet—usually a function of the cup size of the nozzle component, and the like.

It is also desirable that the shielding gas maintains a laminar flow profile at a significant distance from the nozzle orifice, i.e. that the shielding gas column maintains a substantially laminar flow profile for a relatively long length. This allows the welding device to be operated with the tungsten electrode extending (sticking out) further from the end of the nozzle to improve visibility and accessibility to the weld area, which allows for a user of the welding device to more effectively weld tighter or difficult to reach joints. For these reasons, higher quality and more easy to obtain welds may be achieved where the welding device provides a shielding gas column having a long-lasting laminar flow profile.

In order to provide a shielding gas column having a desirable laminar flow profile, conventional welding devices typically utilize gas nozzles, gas lenses, or a combination thereof.

A gas nozzle for a welding device, also often referred to simply as a nozzle or a cup, is a component attached to the head of a welding device and having a outlet through which the shielding gas exits the welding device and flows toward the weld area in what is known as a shielding gas column. The outlet of a gas nozzle generally converges to provide a narrowed cross-sectional flow area at the outlet, which decreases turbulence. Nozzles may be made of any type of heat resistant materials, but are generally made from ceramics, metals (e.g. copper, brass, etc.), or a combination thereof. Many welding devices, such as gas tungsten arc welding devices, utilize replaceable ceramic nozzles that are either screwed into the torch head or pushed into place on the torch head. While nozzles serve to reduce turbulence in the shielding gas column, as a general rule a tungsten electrode can stick out a distance equivalent to about one-half of the nozzle outlet diameter before the shielding gas column becomes turbulent.

A gas lens for a welding device is a component that is attached to a welding device in place of a conventional collet body. A typical gas lens is composed of a metal (e.g. copper and/or brass) body with one or more layered mesh screens of steel/stainless steel (stainless steel offers greater durability and resistance to rust and corrosion than steel). More advanced gas lenses utilize an engineered porous filter media in place of the mesh screens. Both the mesh screens and the porous filter media serve to evenly distribute the shielding gas around the electrode, creating a shielding gas having a plug flow profile, in which the velocity of the gas is substantially equivalent across the entire cross-section of the flow channel. By creating plug flow, gas lenses reduce shielding gas turbulence and provide shielding gas columns having longer laminar flow profiles. This, in turn, allows for an extension of the electrode a greater distance beyond the end of the welding torch. For instance, as a general rule when utilizing a gas lens and a nozzle, a tungsten electrode can stick out a distance up to about the nozzle outlet diameter before the shielding gas column becomes turbulent.

Embodiments of the present invention are directed to a device that provides a welding device with a shielding gas column having a laminar flow profile that extends further from the gas outlet than those that have been achieved using conventional components. In some embodiments, therefore, the device may replace conventional gas lenses and nozzles.

SUMMARY OF THE INVENTION

Embodiments of the present disclosure are directed to a component of a welding implement that is configured to produce a shielding gas having a developed flow profile, which provides for a shielding gas column having a laminar profile over a greater length than has been achieved through conventional means. The component comprises a body extending between a first end and a second end, the first end being configured to attach to the head of a welding implement. The body defines a channel, which extends through the body between the first and second ends. The channel is configured for the flow of shielding gas from an inlet at the first end of the body to an outlet at the second end of the body. One or more flow restrictors are located within the channel. The one or more flow restrictors are configured to provide higher resistance to the flow of shielding gas at increasing distances from the center of the channel. By providing increasingly greater resistance toward the periphery of the channel, a developed shielding gas flow profile may be achieved over a relatively short flow length.

Embodiments of the present disclosure are also directed to a welding implement, such as a gas tungsten arc welding (GTAW) torch, a gas metal arc welding (GMAW) torch, or a laser welding device, comprising a component that is configured to produce a shielding gas having a fully developed flow profile. For example, embodiments of the present disclosure are directed to a welding implement comprising the component described above.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Figure 1:
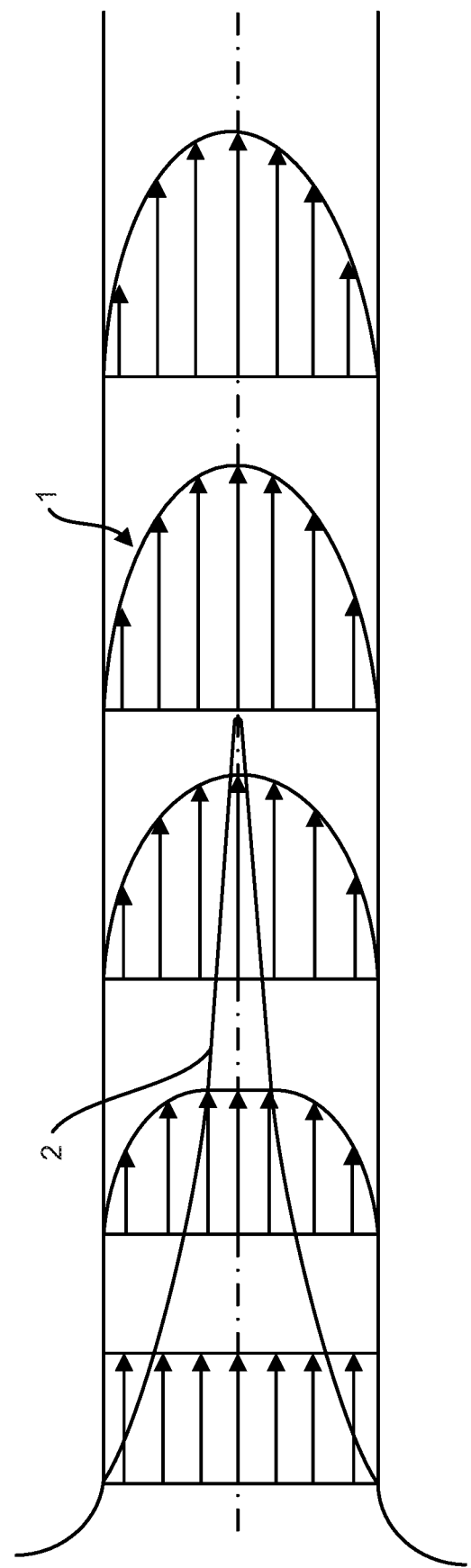
FIG. 1 is an illustration of the velocity profile of a fluid flowing through a conduit, which shows the transition to developed flow.

Reference will now be made in detail to certain embodiment(s), examples of which are illustrated in the accompanying drawings. Whenever possible, the same reference numerals will be used throughout the drawings to refer to the same or like parts.

A welding implement or welding device refers to any device that is configured to perform a welding operation. Welding operation, as used herein, includes those that result in joining, such as welding or brazing of two or more physical objects, overlaying, texturing, heat-treating of a physical object, and/or a cut of a physical object). Common welding devices include devices, also often referred to as torches, used to perform gas tungsten arc welding (GTAW) or gas metal arc welding (GMAW). Other welding devices include laser welding devices and plasma welding devices, each of which is known to be sensitive to introduced turbulence in the shielding gas column.

Welding devices such as those listed above apply a column of shielding gas to the weld area in order to protect the molten weld pool from the atmosphere. Without this protection, the molten metal reacts with the gases in the atmosphere and produces discontinuities and defects in the weld. The weld deposits may even have undesired mechanical properties that greatly reduce weld strength. The shielding gas is generally provided as a compressed gas cylinder, which is connected to the welding device. Shielding gases are generally inert gases, with the most commonly used shielding gases being helium, argon, or a mixture of helium and argon. In some applications, the inert gas or gases may also contain a small percentage of another gas, such as hydrogen, nitrogen, oxygen, or carbon dioxide. For example, in some applications, the shielding gas may be a mixture of about 85-95% argon and 5-15% hydrogen, a mixture of about 95-99% argon and 1-5% nitrogen, a mixture of about 95-99% argon and 1-5% oxygen, or a mixture of about 75-90% argon and 10-25% carbon dioxide.

Embodiments of the present disclosure are directed to a component for manipulating the flow of shielding gas within a welding implement so as to produce a desirable flow profile, i.e. a flow profile that provides a shielding gas column that maintains substantially laminar flow an extended distance from the gas outlet of the welding implement. For instance, the component may be configured to manipulate the flow of shielding gas within a welding device so as to produce a developed flow profile.

Developed flow refers to a region of fluid flow through a conduit at which the velocity profile of the flow is substantially fully developed, i.e. at which the velocity profile of the fluid flow through the conduit will continue substantially unchanged (absent changes to the conduit, the introduction of external factors, etc.). A typical transition to fully developed flow 1 is shown in FIG. 1. Typically, in order to obtain fully developed flow 1, a fluid must flow through an entry length of a conduit. The entry length of a conduit refers to the hydrodynamic region where the velocity boundary layers 2 from opposite sides of the conduit have not yet intersected. For typical shielding gases, flow rates, and welding conduit diameters, the entry length is between about 0.5 and about 1.5 meters. Because a conduit of this length is not practical for welding devices or operations, aspects of the present disclosure are related to a manner for producing developed flow in a more compact manner (i.e. in a shorter conduit length).

As shown in FIG. 1, a developed flow profile generally comprises a parabolic shape in which the fluid flowing at the center of the conduit has the highest velocity and the fluid flowing at the walls of the conduit has the lowest velocity. As may be better understood with reference to particular embodiments of the compact component for producing developed flow described herein, in some instances the smooth parabolic line defining the developed flow profile in FIG. 1 may be replaced by a stepped line in which the velocity of the fluid decreases in a stepped manner from the center of the conduit toward the walls of the conduit, as opposed to in a completely smooth parabolic manner. Similarly, particular embodiments of the compact component described herein may produce a rough line, e.g. one containing some irregularities, as opposed to the smooth parabolic line defining the developed flow profile in FIG. 1. Nevertheless, at least for purposes of the present disclosure, stepped and/or rough profiles of this sort are considered to be developed flow so long as the velocity gradient between the center of the conduit and the walls of the conduit is generally present (such that its overall effect on the shielding gas column is largely the same).

Manipulation of the shielding gas to produce a developed flow profile is particularly desirable because it reduces the velocity gradient formed between the shielding gas column and the atmosphere once the shielding gas exits the welding implement. By reducing this velocity gradient, shear-induced turbulence (e.g. turbulence caused by Kelvin-Helmholtz instabilities) is reduced and the shielding gas column is able to maintain laminar flow for a longer distance. As previously described, this allows for a higher quality weld, greater visibility of the weld area, and the use of a greater electrode stick-out length, which may simplify difficult welding operations.

Embodiments of the present disclosure are therefore directed toward devices that manipulate the flow of shielding gas in a welding implement to produce developed flow in a compact manner (i.e. over a distance that is significantly shorter than the entry length that would otherwise be required). In some embodiments, the device may be configured so that the gas exiting the welding implement has a developed flow profile. As previously described, the shielding gas exiting the welding implement may have a stepped or irregular velocity profile as opposed to a smooth velocity profile, and still be considered to be developed flow. Where the gas exiting the welding implement has a developed flow profile, for instance, the velocity gradient formed between the shielding gas column and the atmosphere is reduced upon the gas exiting the terminus of the shielding gas channel of the welding implement.

In other embodiments, the device may be configured to utilize the velocity gradient between the shielding gas column and the surrounding atmosphere that is present once the shielding gas exits the welding implement in order to convert the velocity profile of the shielding gas to a developed flow profile. While a developed flow profile reduces the effects of shear-induced turbulence on the shielding gas column, the shear-induced turbulence will nevertheless eventually cause the laminar flowing shielding gas column to breakdown into turbulent flow. Creating a developed flow profile simply delays the point at which this breakdown occurs after the gas exits the welding implement, providing for a shielding gas column that is able to maintain laminar flow over a longer distance from the welding implement. In some embodiments, it may be possible to extend the length over which the shielding gas column maintains laminar flow beyond that which would be obtained by a shielding gas that is caused to exit the welding implement with a developed flow profile. Specifically, by causing the shielding gas column to obtain a developed flow profile at some distance after the shielding gas exits the welding implement rather than causing the shielding gas to exit the welding implement with an already-developed flow profile, the length of a laminar shielding gas column may be further increased by the distance from the welding implement over which the surrounding atmosphere acts on the shielding gas to bring about a developed flow profile.

It is understood that the velocity gradient formed between a shielding gas column and the surrounding atmosphere causes the outer portions of the shielding gas column to slow and the inner portions of the shielding gas column to speed up. Accordingly, it may be possible to utilize this effect in order to create a developed flow profile at some distance, identified as D, after the terminus of the shielding gas channel of the welding implement. Specifically, the velocity gradient between the shielding gas column and the surrounding atmosphere over the distance D is used to bring about developed flow, rather than to breakdown an already-developed flow profile. Accordingly, the velocity gradient will only begin to breakdown the developed flow profile after distance D as opposed to immediately upon exit of a shielding gas from the welding implement. In this way, the laminar shielding gas column may be further extended beyond that achieved by a shielding gas exiting a welding implement with fully developed flow profile by distance D.

Figure 9:
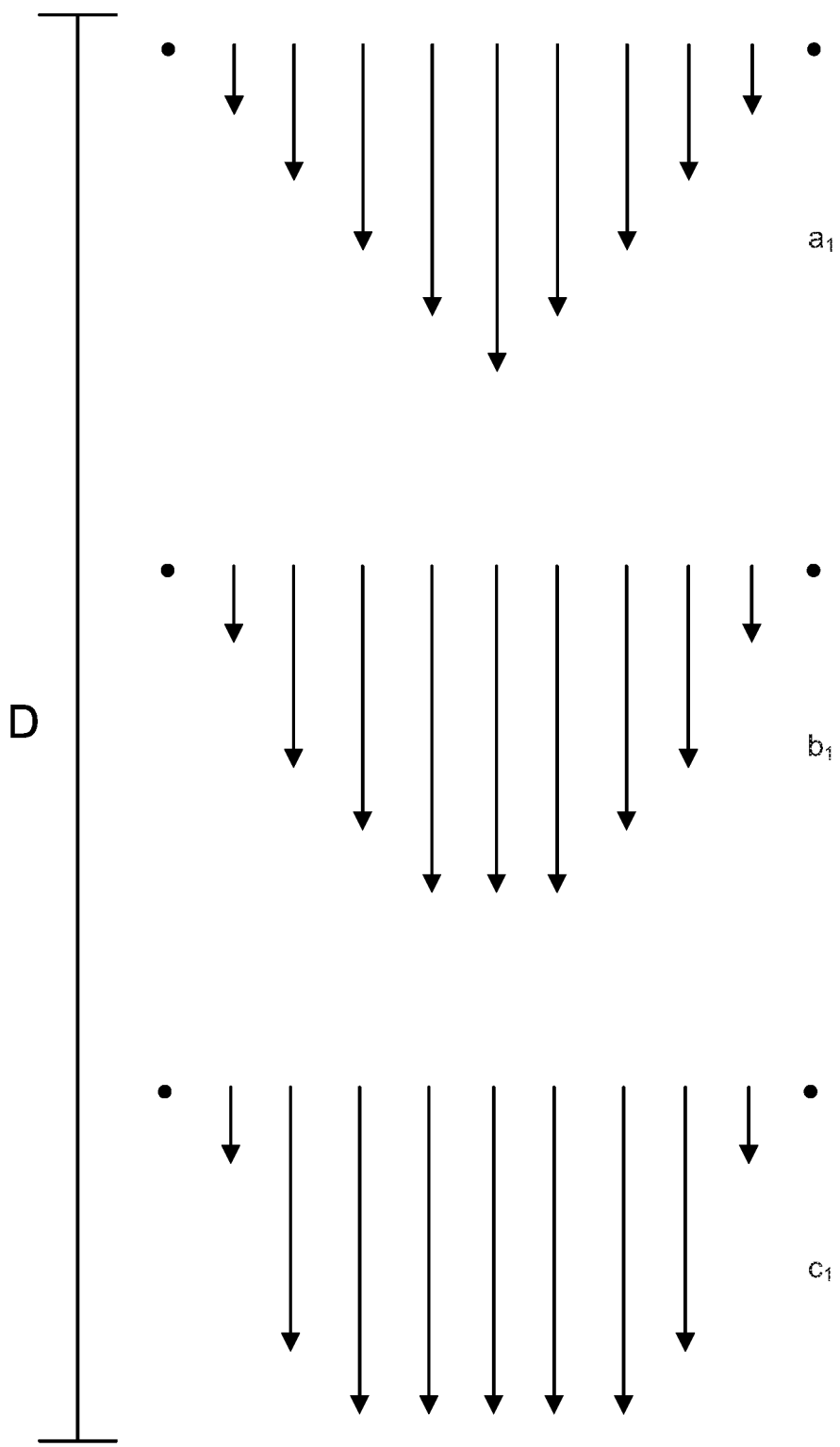
FIG. 9 is an illustration of the velocity profile of a fluid transitioning from constant shear flow to developed flow.

This effect is shown, for example, in FIG. 9. FIG. 9 shows three flow profiles, labeled a1, b1, and c1. The flow profile at a1 is a constant shear flow profile. As with a developed flow profile, a constant shear flow profile is one in which the fluid flowing at the center of the conduit has the highest velocity and the fluid flowing at the walls of the conduit has the lowest velocity. Rather than a substantially parabolic shape, however, in a constant shear flow profile the velocity gradient from the center of the conduit to the walls of the conduit is linear, such as is illustrated at a1. In some embodiments, it may be desirable to produce a substantially constant shear flow. Although the velocity gradient is shown in a1 as being perfectly linear, the velocity gradient may take on other shapes and still be considered substantially constant shear flow. For instance, the shielding gas may have a slightly curved velocity profile and still be considered to be substantially constant shear flow. Moreover, the shielding gas may have a stepped or irregular velocity profile as opposed to a linear velocity profile, and still be considered to be substantially constant shear flow.

As the surrounding atmosphere acts on a shielding gas exiting a welding implement with a substantially constant shear flow, the flow profile of the shielding gas will transition to a developed flow profile, such as that shown at c1. This transition is illustrated in FIG. 9. The flow profile shown at b1 is an intermediate profile between the constant shear profile at a1 and the developed flow profile at c1. The distance over which the transition from the flow profile at a1 to the flow profile at c1 occurs is labeled D. As described above, a laminar shielding gas column may be further extended by distance D by utilizing the surrounding atmosphere to bring about developed flow in this manner.

Accordingly, in some embodiments the device may be configured so that the shielding gas exiting a welding implement has a flow profile that will be acted on by the surrounding atmosphere to bring about developed flow after exiting the welding implement. For instance, the device may be configured to produce a shielding gas flow profile which will be acted on by the surrounding atmosphere to bring about developed flow at a distance D from the terminus of the shielding gas channel of the welding implement. For example, the device may be configured so that the gas exiting the welding implement has a substantially constant shear flow profile. In other embodiments, the device may be configured so that the gas exiting the welding implement has an intermediate flow profile, i.e., one that would occur during the transition between a constant shear flow profile and a developed flow profile.

Whether a device is configured to produce (a) a shielding gas having a developed flow profile at the terminus of the welding implement or (b) a shielding gas having a flow profile that is acted on by the surrounding atmosphere to obtain a developed flow profile after the terminus of the welding implement, the device may be configured to modify the flow of the shielding gas in largely the same manner.

In particular, these devices utilize one or more flow restrictors, which operate by restricting fluid flow, and more particularly by introducing a greater restriction to fluid flow toward the walls of the shielding gas flow channel than toward the center of the shielding gas flow channel. Put another way, the one or more flow restrictors are configured to provide higher resistance to the flow of shielding gas at increasing distances from the center of the shielding gas flow channel. In this way, the flow of shielding gas through the one or more flow restrictors may cause the velocity profile of the shielding gas to quickly approach, and in some instances reach, a developed flow profile, such as for example one that resembles the fully developed flow profile shown in FIG. 1, without requiring the shielding gas to flow through a significant channel entry length. By simply varying the relative amounts of resistance provided by the one or more flow restrictors, one may similarly cause the velocity profile of the shielding gas to quickly approach or reach either a substantially constant shear flow profile or a flow profile that is an intermediate between a constant shear flow profile and a developed flow profile.

Figure 2:
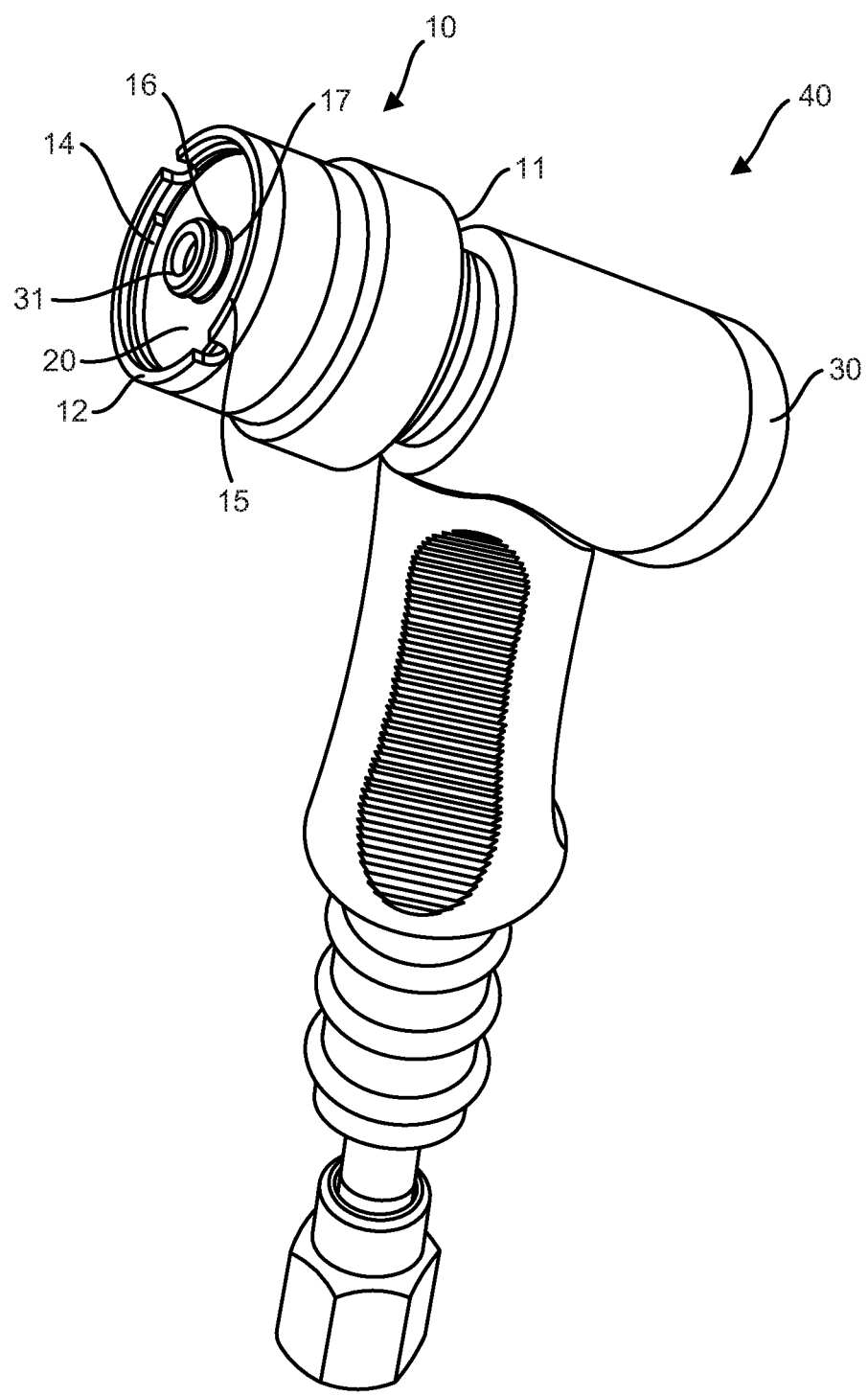
FIG. 2 is a perspective view of a gas tungsten arc welding torch comprising a component according to an embodiment of the present disclosure.

The devices described herein are generally configured as components of a welding implement. An embodiment of a component 10 according to the present disclosure is illustrated in FIG. 2. The component 10 comprises a body extending between a first, proximal end 11 and a second, distal end 12. The proximal end 11 of the component is configured to attach to a welding implement, such as for example a conventional GTAW welding torch 30, as shown in FIG. 2. The component 10 may be a consumable device that is readily attachable to a welding implement and removed from the welding implement. For example, the proximal end 11 of the component 10 may be designed to mate with the head of the torch by a screw fit, a snap fit, a friction fit, or the like. Alternatively, the component 10 may be integral with the welding implement itself (for instance, the one or more flow restrictors alone may be removable/replaceable). The distal end 12 of the component 10 is preferably located at or near the distal end of the torch assembly 40. In some embodiments, such as that shown in FIG. 2, the distal end 12 of the component may itself form the gas outlet of the welding implement 30. In other (not illustrated) embodiments, a nozzle may be inserted over the component 10 and extend beyond the distal end 12 of the component.

The component 10 comprises a shielding gas flow channel 14 that extends through the body and that is configured for the flow of shielding gas between the proximal end 11 and the distal end 12 of the component. For instance, when the component 10 is attached to a welding implement 30, channel 14 is configured to align with the shielding gas flow channel of the welding implement, such that shielding gas flows from the welding implement into (and through) channel 14. The channel 14 comprises at least an outer wall 15, which may for example be defined by the interior surface of the body as in the embodiment shown in FIG. 2, or may comprise an additional wall located in the interior of the body.

The component 10 also comprises one or more flow restrictors 20 positioned within the channel 14. The one or more flow restrictors 20 can take a number of different forms, as described in detail below. No matter the form, however, the one or more flow restrictors 20 should not block the entire cross-section of the component 10. Rather, the center of the pathway extending between the first proximal end 11 and the second distal end 12 of the component 10 should remain unobstructed so that at least the electrode (not illustrated in FIG. 2) or another component (e.g. a wire in some laser welding devices) may extend therethrough.

For instance, in some embodiments, the component 10 also comprises a central electrode-receiving passage 16. The electrode-receiving passage 16 is located concentrically inward from the shielding gas channel 14. In some embodiments, the electrode-receiving passage 16 may be configured to receive both the electrode and a conventional collet 31. A collet 31 is a component of a GTAW torch that is designed to hold the tungsten electrode in place and create the electrical contact necessary for good current transfer. In some embodiments, the component 10 may comprise an inner wall 17 which serves to divide the electrode-receiving passage 16 from the shielding gas flow channel 14 that surrounds it. In other embodiments, the one or more flow restrictors 20 may simply include a central bore that forms the boundary of the electrode-receiving passage 16, in which case the collet 31 may serve as an inner wall to channel 14 when the component 10 is attached to a torch 30.

The one or more flow restrictors 20 may take on any of a number of forms. In some embodiments, the one or more flow restrictors 20 may include a plurality of fluid flow conduits that provide varying degrees of flow resistance. For example, a flow restrictor 20 may comprise a plurality of gas conduits, the plurality of gas conduits being configured such that at increasing distances from the center of the shielding gas flow channel 14, the gas conduits have decreasing cross-sections, increasing lengths, or a combination thereof. For purposes of the present description, length is used to designate the direction between the proximal end 11 and the distal end 12 of the component 10. In other words, length is used in a manner that corresponds to the direction of shielding gas flow through the component 10.

In some embodiments, for example, at least a portion of channel 14 may include a flow restrictor 20 comprising a plurality of individual fluid flow conduits having varying cross-sectional areas (or hydraulic diameters where the conduits have a circular cross-section). More particularly, the fluid flow conduits located near the outer wall 15 of the channel may have smaller cross-sectional areas (or smaller diameters) than the fluid flow conduits located near the center of the channel (i.e. near the electrode-receiving passage 16). Optionally, the lengths of the plurality of fluid flow conduits may be substantially the same. Since the flow of the shielding gas through the narrower conduits is restricted to a greater degree than the flow of the shielding gas through the wider conduits, the velocity of the shielding gas exiting the fluid flow conduits near the outer wall 15 of the channel is lower than the velocity of the shielding gas exiting the fluid flow conduits near the center of the channel. The result is a shielding gas that has been manipulated to approach or obtain a desired flow profile over a relatively short distance.

In other embodiments, at least a portion of the channel 14 may include a flow restrictor 20 comprising a plurality of individual fluid flow conduits having varying lengths. More particularly, the fluid flow conduits located near the outer wall 15 of the channel may have greater lengths than the fluid flow conduits located near the center of the channel (i.e. near the electrode-receiving passage 16). Optionally, the cross-sectional areas (or hydraulic diameters) of the plurality of fluid flow conduits may be substantially the same. Since the flow of the shielding gas through the longer conduits is restricted to a greater degree than the flow of the shielding gas through the shorter conduits, the velocity of the shielding gas exiting the fluid flow conduits near the outer wall 15 of the channel is lower than the velocity of the shielding gas exiting the fluid flow conduits near the center of the channel. The result is a shielding gas that has been manipulated to approach or obtain a desired flow profile over a relatively short distance.

In yet other embodiments, both of the above concepts may be utilized together. For instance, the fluid flow conduits located near the outer wall 15 of the channel may have both (a) smaller cross-sectional areas and (b) greater lengths than the fluid flow conduits located near the center of the channel (i.e. near the electrode-receiving passage 16). Since the flow of the shielding gas through the narrower and longer conduits is restricted to a greater degree than the flow of the shielding gas through the wider and shorter conduits, the velocity of the shielding gas exiting the fluid flow conduits near the outer wall 15 of the channel is lower than the velocity of the shielding gas exiting the fluid flow conduits near the center of the channel. The result is a shielding gas that has been manipulated to approach or obtain a desired flow profile over a relatively short distance.

The fluid flow conduits of the above embodiments may take on a number of forms and/or arrangements. For instance, the plurality of gas conduits may comprise a plurality of adjacent conduits.

In some embodiments, the flow restrictor 20 may comprise, for example, a honeycomb-like structure 21 that is provided with a plurality of passages arranged across the cross-section of the structure and with the passages having the desired orientation of varying cross-section, length, or a combination thereof.

Figure 3A:
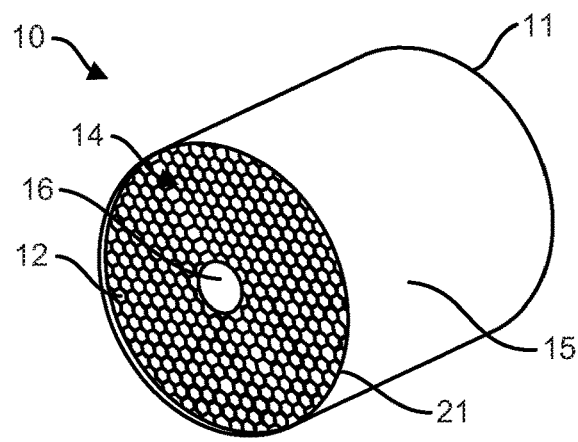
FIG. 3A is a perspective view of a component according to an embodiment of the present disclosure having a flow restrictor that comprises a honeycomb structure.
Figure 3B:
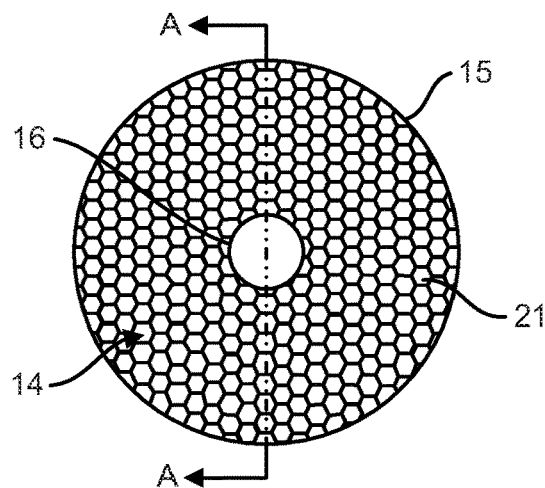
FIG. 3B is a front elevation view of the component shown in FIG. 3A.
Figure 3C:
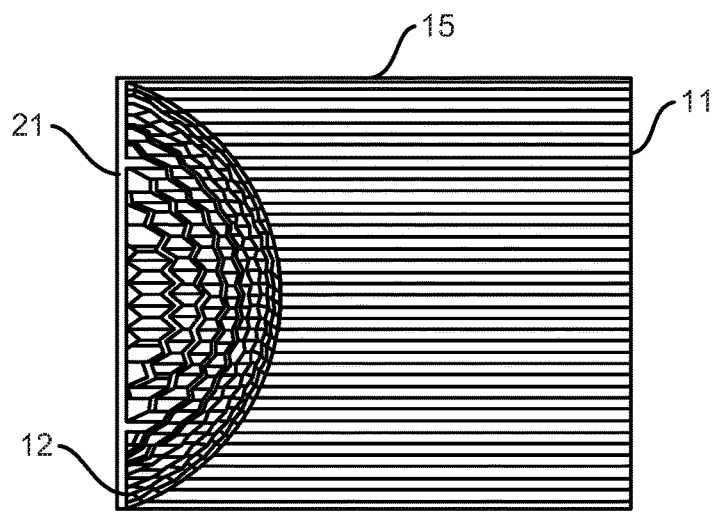
FIG. 3C is a sectional view, taken along line A-A, of the component shown in FIGS. 3A and 3B.

An example of a flow restrictor 20 having a honeycomb-like structure 21 is shown in FIGS. 3A through 3C. As can be seen in the Figures, the honeycomb structure 21 located inside at least a portion of the shielding gas flow channel 14 creates a plurality of separate gas conduits within at least a portion of the channel. In the embodiment shown in FIGS. 3A to 3C, the honeycomb structure 21 is configured so that the gas conduits located near the outer wall 15 of the channel have greater lengths than the gas conduits located near the center of the channel (i.e. near the electrode-receiving passage 16). The may be achieved, for instance, by having the distal end of the honeycomb structure 21 curve or slant inward (i.e., away from the distal end 12 of the component) from the outer wall 15 toward the center of the channel. This arrangement can most clearly be seen in FIG. 3C, which illustrates an inward curving of the distal end of the honeycomb structure 21 to produce gas conduits of varying lengths. While the embodiment shown in FIGS. 3A to 3C comprises a honeycomb structure 21 having an inward curving distal end, other embodiments may comprise a honeycomb structure having a distal end that slants inward, e.g. in a substantially linear manner, from the outer wall 15 to the electrode-receiving passage 16. The honeycomb structure 21 may also be configured to produce gas conduits of varying lengths in other, non-illustrated manners. For instance, the proximal end of the honeycomb structure 21 may curve or slant inward (e.g., away from the proximal end 11 of the component) rather than, or in combination with, the curving or slanting inward of the distal end described above.

As illustrated in FIG. 3B, the cross-sectional areas of the plurality of gas conduits defined by the honeycomb structure 21 in embodiment shown in FIGS. 3A through 3C are substantially the same. As described generally above, however, the honeycomb structure 21 may be configured to provide that the gas conduits located near the outer wall 15 of the channel may have smaller cross-sectional areas than the gas conduits located near the center of the channel (i.e. near the electrode-receiving passage 16). This may be either (a) in addition to or (b) in place of the honeycomb structure 21 being configured to provide gas conduits of varying lengths.

In other embodiments, the flow restrictor 20 may comprise a plurality of individual conduits, e.g. pipes 22, arranged within the channel 14 to have the desired orientation of varying cross-section, length, or a combination thereof.

Figure 4A:
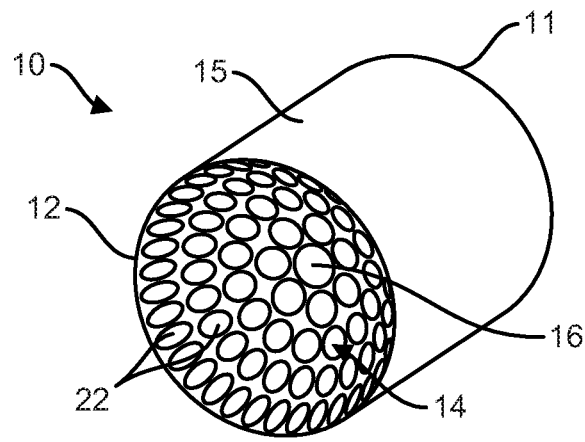
FIG. 4A is a perspective view of a component according to an embodiment of the present disclosure having a flow restrictor that comprises a plurality of adjacent pipes.
Figure 4B:
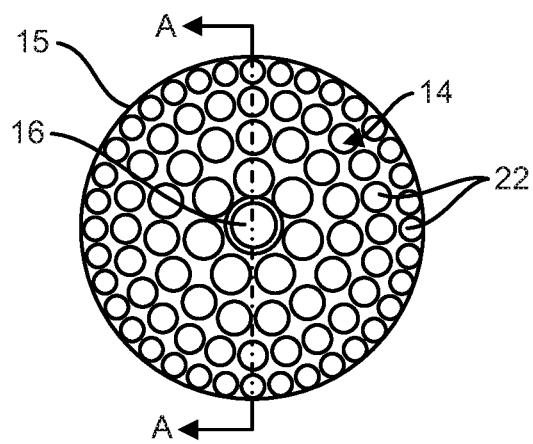
FIG. 4B is a front elevation view of the component shown in FIG. 4A.
Figure 4C:
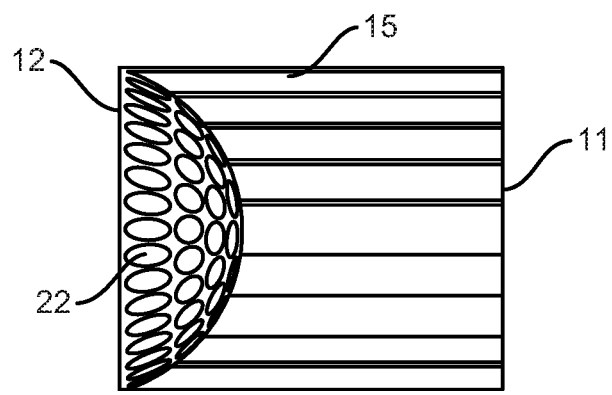
FIG. 4C is a sectional view, taken along line A-A, of the component shown in FIGS. 4A and 4B.

An example of a flow restrictor 20 having a plurality of individual pipes 22 is shown in FIGS. 4A through 4C. As can be seen in the Figures, the plurality of pipes 22 positioned inside at least a portion of the shielding gas flow channel 14 creates a plurality of gas conduits within at least a portion of the channel. In the embodiment shown in FIGS. 4A to 4C, the plurality of pipes 22 are configured so that the gas conduits located near the outer wall 15 of the channel have greater lengths than the gas conduits located near the center of the channel (i.e. near the electrode-receiving passage 16). This may be achieved, for instance, by having the distal ends of the plurality of pipes 22 located at different distances from the distal end 12 of the component. For instance, the pipes 22 located toward the center of the channel may have distal ends located farther inward from the distal end of the component 12 than the pipes located near the outer wall 15 of the channel 14.

Where the plurality of adjacent pipes 22 are formed within a plug, as is shown in FIGS. 4A through 4C for instance, the plurality of pipes 22 may be caused to have varying lengths by having the portion of the plug defining the distal ends of the pipes curve or slant inward (i.e., away from the distal end 12 of the component) from the outer wall 15 toward the center of the channel. This arrangement can most clearly be seen in FIG. 4C, which illustrates such an inward curving of the distal ends of the plurality of pipes 22 to produce gas conduits of varying lengths. While the embodiment in FIGS. 4A to 4C shows the portion of the plug defining the distal ends of the pipes curving inward, the distal end of the plug may also slant inward, e.g. in a substantially linear manner, from the outer wall 15 to the electrode-receiving passage 16. In other, non-illustrated embodiments, such as where the plurality of pipes 22 comprises a bundle of individual pipes (as opposed to a plug defining the plurality of pipes), the plurality of pipes may be configured to have varying lengths by arranging the individual pipes in the bundle so that the pipes positioned toward the outer wall 15 of the channel have longer lengths than the pipes positioned toward the center of the channel.

The plurality of pipes 22 may also be configured to produce gas conduits of varying lengths in other, non-illustrated manners. For instance, the proximal ends of the plurality of pipes 22 may be located at different distances from the proximal end 11 of the component, such as in the ways described above. This may be rather than, or in combination with, the differing locations of the distal ends of the pipes 22 in relation to the distal end 12 of the component. Additionally, as can most clearly be seen in FIG. 4B, the plurality of pipes 22 in the illustrated embodiment are configured to provide that the gas conduits located near the outer wall 15 of the channel have smaller cross-sectional areas than the gas conduits located near the center of the channel (i.e. near the electrode-receiving passage 16). In other embodiments, however, the plurality of pipes 22 may be configured to provide gas conduits having only (a) varying cross-sectional areas or (b) varying lengths, in contrast with the embodiment illustrated in FIGS. 4A through 4C, which provides both. In other embodiments, the plurality of gas conduits may comprise a plurality of concentric conduits.

For instance, the flow restrictor 20 may comprise a plurality of nested pipes 23, in which the difference in cross-sectional area of adjacently nested pipes decreases toward the outer wall 15 of the channel. Where the cross-section of the nested pipes 23 is substantially circular, for example, adjacently nested pipes near the outer wall 15 may have diameters that are relatively close to one another, such that the conduits created by the adjacently nested pipes are relatively narrow. Near the center of the channel (i.e. near the electrode-receiving passage 16), the difference between the diameters of adjacently nested pipes 23 may be larger, such that the conduits created by the adjacently nested pipes are wider. Alternatively, the flow restrictor 20 may comprise a plurality of nested pipes 23 in which the lengths of the outer pipes may be longer than those of the inner pipes, such that the conduits created by the adjacently nested pipes are longer near the outer wall 15 of the channel than near the center of the channel. Or, the plurality of nested pipes 23 may be configured so that the conduits created by the nesting of the pipes are both (a) narrower and (b) longer near the outer wall 15 of the channel than near the center of the channel.

Figure 5A:
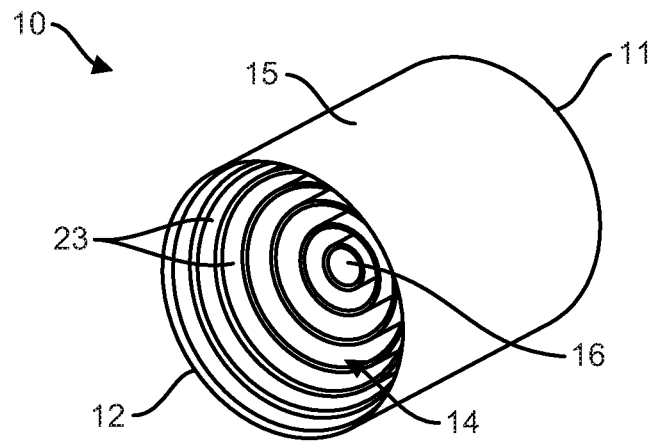
FIG. 5A is a perspective view of a component according to an embodiment of the present disclosure having a flow restrictor that comprises a plurality of nested pipes.
Figure 5B:
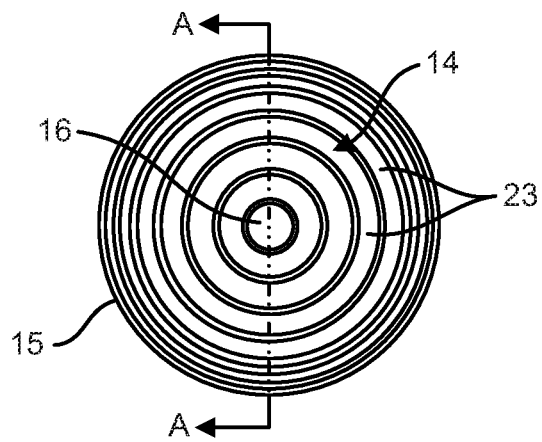
FIG. 5B is a front elevation view of the component shown in FIG. 5A.
Figure 5C:
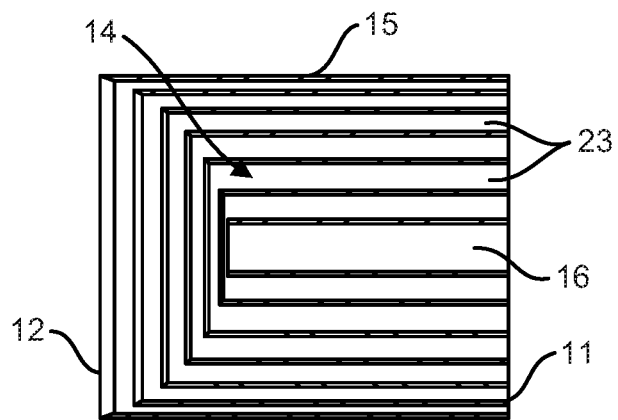
FIG. 5C is a sectional view, taken along line A-A, of the component shown in FIGS. 5A and 5B.

An example of a flow restrictor 20 having a plurality of nested pipes 23 is shown in FIGS. 5A through 5C. As can be seen in the Figures, the plurality of nested pipes 23 inside at least a portion of the shielding gas flow channel 14 creates a plurality of gas conduits within at least a portion of the channel. In the embodiment shown in FIGS. 5A to 5C, the plurality of nested pipes 23 are configured so that the gas conduits located near the outer wall 15 of the channel have greater lengths than the gas conduits located near the center of the channel (i.e. near the electrode-receiving passage 16). This may be achieved, for instance, by having the distal ends of the plurality of pipes 23 located at different distances from the distal end 12 of the component. This arrangement can most clearly be seen in FIG. 5C, which illustrates that the pipes 23 located toward the center of the channel have distal ends that are located farther inward from the distal end of the component 12 than the pipes located near the outer wall 15 of the channel 14. The plurality of pipes 23 may also be configured to produce gas conduits of varying lengths in other, non-illustrated manners. For instance, the proximal ends of the plurality of pipes 23 may be located at different distances from the proximal end 11 of the component in much the same way as is described above. This may be rather than, or in combination with, the differing locations of the distal ends of the pipes 23 in relation to the distal end 12 of the component.

Additionally, as can most clearly be seen in FIG. 5B, the plurality of nested pipes 23 are configured to provide that the gas conduits located near the outer wall 15 of the channel have smaller cross-sectional areas than the gas conduits located near the center of the channel (i.e. near the electrode-receiving passage 16). As previously described, this may be achieved by varying the differences in pipe diameter of adjacent nested pipes 23—e.g., adjacent pipes toward the center of the channel may have a greater difference in diameter than adjacent pipes toward the outer wall of the channel. In other embodiments, the plurality of pipes 23 may be configured to provide gas conduits having only (a) varying cross-sectional areas or (b) varying lengths, in contrast with the embodiment illustrated in FIGS. 5A through 5C, which provides both.

In other embodiments, the flow restrictor 20 may comprise a single spiraled structure 24 that operates to produce a plurality of gas conduits between adjacent rings of the structure. The flow restrictor 20 may comprise a spiraled structure 24 that is configured so that (a) the cross-sectional spacing between adjacent portions of the spiraled structure decreases at increasing distance from the center of the channel, (b) the length of portions of the spiraled structure increases at increasing distance from the center of the channel, or (c) a combination thereof.

Figure 6A:
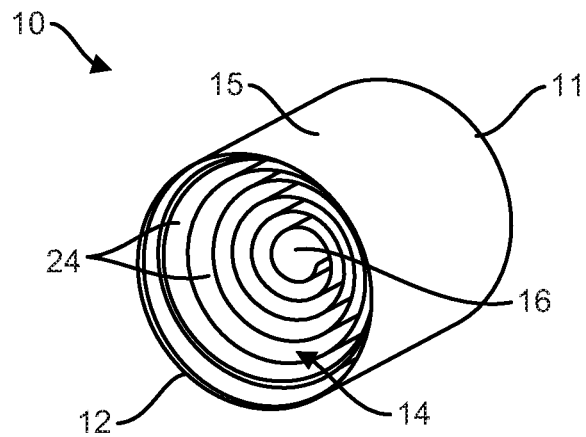
FIG. 6A is a perspective view of a component according to an embodiment of the present disclosure having a flow restrictor that comprises a spiraled structure.
Figure 6B:
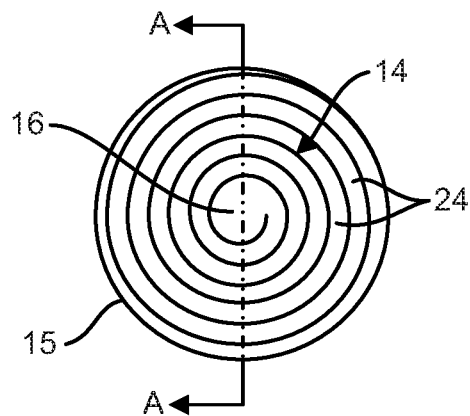
FIG. 6B is a front elevation view of the component shown in FIG. 6A.
Figure 6C:
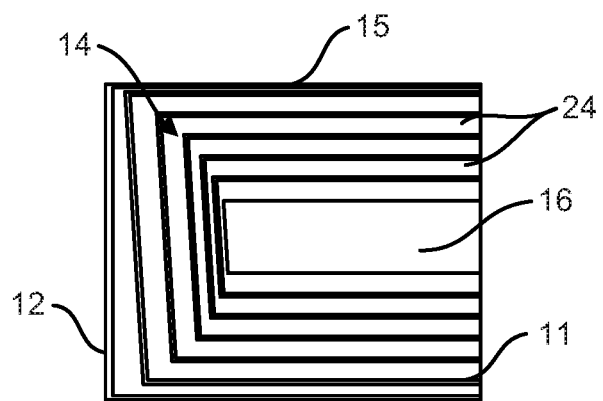
FIG. 6C is a sectional view, taken along line A-A, of the component shown in FIGS. 6A and 6B.

An example of a flow restrictor 20 having a spiraled structure 24 that produces a plurality of gas conduits is shown in FIGS. 6A through 6C. As can be seen in the Figures, the spiraled structure 24 inside at least a portion of the shielding gas flow channel 14 creates a plurality of gas conduits within at least a portion of the channel. In the embodiment shown in FIGS. 6A to 6C, the spiraled structure 24 is configured so that the gas conduits located near the outer wall 15 of the channel have greater lengths than the gas conduits located near the center of the channel (i.e. near the electrode-receiving passage 16). This may be achieved, for instance, by having the distal ends of the various rings of the spiraled structure 24 located at different distances from the distal end 12 of the component. This arrangement can most clearly be seen in FIG. 6C, which illustrates that the rings of the spiraled structure 24 located toward the center of the channel have distal ends located farther inward from the distal end of the component 12 than the rings of the spiraled structure located near the outer wall 15 of the channel 14. The spiraled structure 24 may also be configured to produce gas conduits of varying lengths in other, non-illustrated manners. For instance, the proximal ends of the rings of the spiraled structure 24 may be located at different distances from the proximal end 11 of the component in much the same way as is described above with respect to the distal ends. This may be rather than, or in combination with, the differing locations of the distal ends of the spiraled rings in relation to the distal end 12 of the component.

As illustrated in FIG. 6B, the cross-sectional areas of the plurality of gas conduits defined by the spiraled structure 24 in the embodiment shown in FIGS. 6A through 6C are substantially the same. As described generally above, however, the spiraled structure 24 may be configured to provide that the gas conduits located near the outer wall 15 of the channel may have smaller cross-sectional areas than the gas conduits located near the center of the channel (i.e. near the electrode-receiving passage 16). This may be achieved, for example, by varying the differences in diameter between adjacent rings of the spiraled structure 24—e.g., adjacent rings located toward the center of the channel may have a greater difference in diameter than adjacent rings located toward the outer wall of the channel. This may be either (a) in addition to or (b) in place of the spiraled structure 24 being configured to provide gas conduits of varying lengths. With respect to each of the above-described embodiments, the exact number of fluid flow conduits, the diameters of the plurality of conduits, and/or the lengths of the plurality of conduits may be varied (such as by routine optimization) in order to obtain a particularly desired flow profile. Moreover, the flow restrictor 20 may be made of any material that is capable of withstanding high temperatures. In some preferred embodiments, for example, the flow restrictor 20 may be metallic, ceramic, or a combination thereof.

In other embodiments, the flow restrictor 20 may comprise one or more materials packed within at least a portion of the shielding gas flow channel 14 in a manner that restricts the flow of the gas to varying degrees. For instance, at least a portion of the channel 14 may be packed with one or more materials along varying lengths of the channel and/or at least a portion of the channel 14 may be more tightly packed with one or more materials toward the outer wall 15 of the channel than toward the center of the channel (i.e. near the electrode-receiving passage 16).

Figure 7:
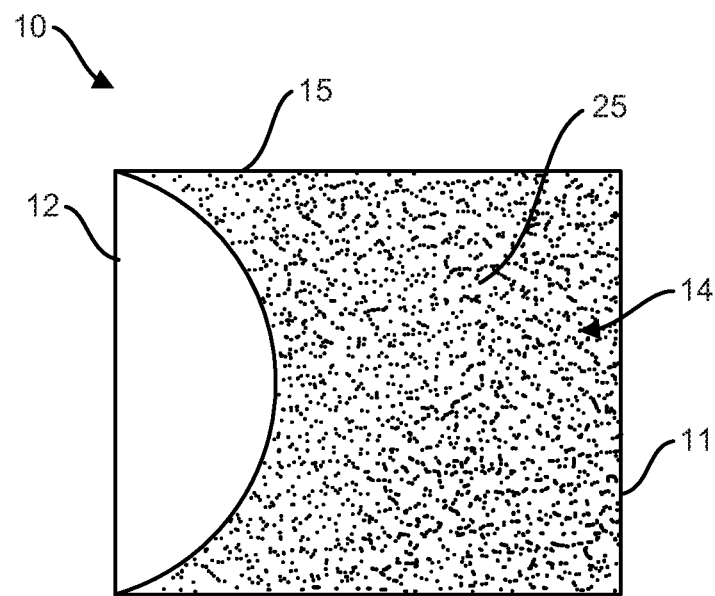
FIG. 7 is a sectional view of a component according to an embodiment of the present disclosure having a flow restrictor that comprises a packed bed material.

In some embodiments, for instance, the flow restrictor 20 may comprise a packed bed material 25. By filling at least a portion of the shielding gas channel 14 with a packing material 25, a plurality of conduits between the individual fragments of packing material are created. By varying the length of the packed bed, for example, one may obtain a flow restrictor that manipulates the shielding gas to approach or obtain developed flow over a relatively short distance. For example, the packed bed 25 may extend for greater lengths of the shielding gas channel 14 at increasing distance from the center of the channel (i.e. near the electrode-receiving passage 16). Accordingly, the shielding gas is required to flow through a relatively short packed bed 25 toward the center of the channel while at the same time being required to flow through a relatively long packed bed toward the outer wall 15 of the channel. An example of a flow restrictor 20 having a packed bed 25 of this sort is shown in FIG. 7. Because the amount of packed bed 25 through which the shielding gas must traverse is tied to the amount of flow restriction placed on the shielding gas, the result is a shielding gas that encounters higher resistance at increasing distances from the center of the channel. This may manipulate the gas flowing through the channel 14 to approach or obtain a desired flow profile over a short distance.

The packing material 25 may comprise any materials that are capable of withstanding high temperatures. For example, the packing material 25 may comprise metals, ceramics, polymers, thermoset plastics, or a combination thereof. The sizes and orientation of the gas flow conduits within the packed bed may vary depending at least in part on the properties and packing characteristics of the packing material 25 selected. Accordingly, the sizes and shapes of the packing material 25 may be selected to provide a desirable degree of flow restriction. In one example, the packing material 25 may comprise spherical or substantially spherical materials that are closely packed and/or sintered together to produce narrow gas flow conduits.

Figure 8:
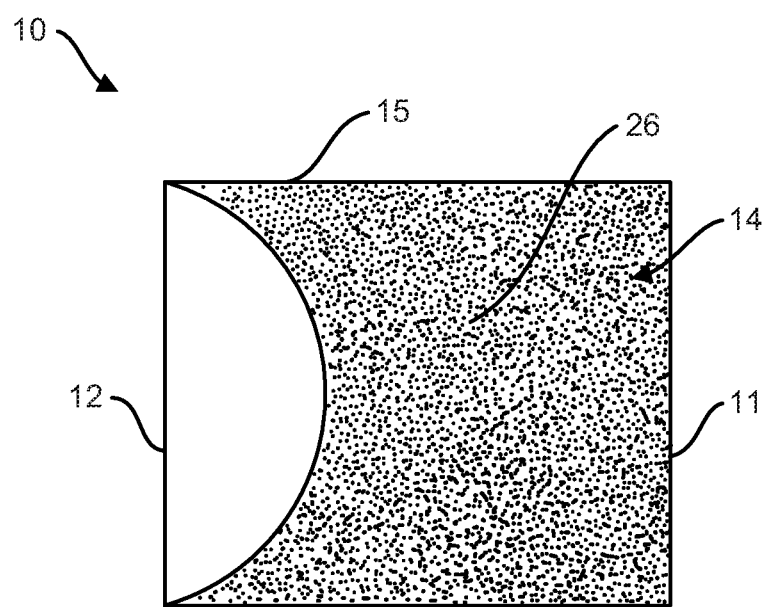
FIG. 8 is a sectional view of a component according to an embodiment of the present disclosure having a flow restrictor that comprises a porous material.

In other embodiments, the flow restrictor 20 may comprise a porous material 26. A porous material 26 contains a plurality of pores which act as conduits through which the shielding gas may flow. By varying the length of the channel 14 in which the porous material 26 is contained, one may obtain a flow restrictor 20 that manipulates the shielding gas to approach or obtain developed flow over a relatively short distance. For example, the porous material 26 may extend a greater length of the shielding gas channel 14 at increasing distance from the center of the channel. Accordingly, the shielding gas is required to flow through a relatively small amount of the porous material 26 toward the center of the channel while at the same time being required to flow through a relatively large amount of the porous material toward the outer wall 15 of the channel. An example of a flow restrictor 20 having a porous packing material 26 of this sort is shown in FIG. 8. Because the amount of porous material 26 through which the shielding gas must traverse is tied to the amount of flow restriction placed on the shielding gas, the result is a shielding gas that encounters higher resistance at increasing distances from the center of the channel. This may manipulate the gas flowing through the channel 14 to approach or obtain a desired flow profile over a short distance.

The porous material 26 may comprise any materials that are capable of withstanding high temperatures. For example, the porous material 26 may comprise metals, ceramics, polymers, thermoset plastics, or a combination thereof. The sizes and orientation of the pores within the porous material 26 may vary depending on the porous material selected. Accordingly, the porous material 26 may be selected to provide a desirable degree of flow restriction.

In some embodiments, it may be desirable to include a substantially unrestricted length of channel downstream from the one or more flow restrictors 20. For example, in a situation where the flow profile of the shielding gas is not entirely smooth, this unrestricted length of channel 14 may allow for the stepped or irregular profile to smooth out as the gas from each of the individual conduits merges together to create a unified flow profile. Moreover, if the flow profile of the shielding gas is not yet fully developed when it exits the one or more flow restrictors 20, this unrestricted length of the channel may allow for a unified flow of shielding gas to make transition to developed flow.

Aspects of the present disclosure are also directed to a welding implement, also referred to as a welding device, comprising a component as described in any of the embodiments set forth herein. For example, an embodiment of a GTAW welding device 30 having a component 10 configured to manipulate the shielding gas to produce a desired flow profile is shown in FIG. 2. As shown in FIG. 2, the component 10 may be configured to attach to the head of the welding device 30 such that the electrode-receiving passage 16 of the component surrounds a conventional collet 21. As such, the component 10 may be attached to the welding torch 30 in place of a conventional gas lens or collet body component. Accordingly, components 10 of the present disclosure may be attached to and used with existing welding implements with ease and without any modification to the welding implement itself.

The welding device assembly 40, which comprises the combination of a welding device 30 and the component 10, is operable to obtain a substantially laminar shielding gas column without the attachment of either a gas lens or a nozzle component. Accordingly, embodiments of the welding device assembly 40 are configured to be used without an independent nozzle component. Rather, it is contemplated that a component 10 having a desirable cross-sectional diameter may be selected for a particular welding operation (as is conventionally done with nozzles). Therefore, multiple components 10, each having a different shielding gas channel 14 diameter, may be configured to be attachable to the same welding torch 30. In some embodiments, a separate nozzle component may still be attached to the head of the assembly 40. It may be preferable, however, that the separate nozzle component does not provide a significant convergence of the shielding gas flow channel 14 (or does not provide a convergence at all), as such a convergence could interrupt the desired flow profile produced by the component 10 disclosed herein.

Because the component 10 manipulates the shielding gas to produce a desired flow profile, a welding device assembly 40 comprising the component described herein is able to provide a shielding gas column having a substantially laminar flow over a longer distance than would be obtained using a gas lens and/or a conventional nozzle. For example, a gas tungsten arc welding torch 30 utilizing the component 10 described herein may provide a shielding gas column having a substantially laminar flow at a tungsten stick-out distance that is greater than the diameter of the gas outlet (here the term gas outlet is substituted for nozzle diameter since the assembly 40 of the present disclosure may be configured to operate with or without a nozzle). Alternatively, a gas tungsten arc welding torch 30 utilizing the component 10 described herein may provide a shielding gas column having a substantially laminar flow at a tungsten stick-out distance that is at least 1.1 times the diameter of the gas outlet, alternatively at least 1.2 times the diameter of the gas outlet, alternatively at least 1.3 times the diameter of the gas outlet, alternatively at least 1.4 times the diameter of the gas outlet, alternatively at least 1.5 times the diameter of the gas outlet, alternatively at least 1.6 times the diameter of the gas outlet, alternatively at least 1.7 times the diameter of the gas outlet, alternatively at least 1.8 times the diameter of the gas outlet, alternatively at least 1.9 times the diameter of the gas outlet, alternatively at least 2.0 times the diameter of the gas outlet.

Aspects of the present disclosure are also directed toward a process of manipulating the flow of shielding gas within a welding implement so as to produce a developed flow profile. For instance, the process may include providing a component 10 comprising one or more flow restrictors 20; attaching the component 10 to a welding implement to produce an assembly; and initiating a flow of shielding gas through the welding implement, such that the shielding gas exiting the gas outlet of the assembly has a developed flow profile. In other embodiments, the process may include directing a flow of shielding gas through one or more flow regulators within a welding implement, such that the one or more flow regulators manipulate the flow of shielding gas to produce a developed flow profile. The process may also include performing a welding operation while directing a flow of shielding gas through one or more flow regulators, such that the one or more flow regulators manipulate the flow of shielding gas to produce a developed flow profile.

Alternatively, the process may include providing a component 10 comprising one or more flow restrictors 20; attaching the component 10 to a welding implement to produce an assembly; and initiating a flow of shielding gas through the welding implement, such that the shielding gas exiting the gas outlet of the assembly has a flow profile that is converted to a developed flow profile after exiting the gas outlet of the assembly. In other embodiments, the process may include directing a flow of shielding gas through one or more flow regulators within a welding implement, such that the one or more flow regulators manipulate the flow of shielding gas to produce a flow profile that is acted on by the surrounding atmosphere to produce a developed flow profile. The process may also include performing a welding operation while directing a flow of shielding gas through one or more flow regulators, such that the one or more flow regulators manipulate the flow of shielding gas to produce a flow profile that is acted on by the surrounding atmosphere to produce a developed flow profile.

Determining whether or not a flow of shielding gas has obtained a developed flow profile, a substantially parabolic flow profile, a substantially constant shear flow profile, or an intermediate flow profile may be difficult in practice. Accordingly, it is contemplated that a simulator may be used to simulate the flow profile of a shielding gas through a commercial device in order to determine whether a specific flow profile has been obtained. This may be achieved, for example, by electronically replicating the commercial device, including in particular any device through which the shielding gas flows, and simulating the flow of a shielding gas through the device (such as at one or more operable gas flow rates).

It can be seen that the described embodiments provide a unique and novel device and method that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A component of a welding implement comprising:
 a body extending between a first end and a second end, the first end being configured to attach to a welding implement;
 a shielding gas channel extending through the body between the first end and the second end and configured for a flow of shielding gas between the first end and the second end; and
 one or more flow restrictors within the channel, the one or more flow restrictors being configured to provide successively higher resistance to the flow of shielding gas at increasing distances from the center of the channel.

2. The component of claim 1, wherein the one or more flow restrictors comprise a plurality of gas conduits.

3. The component of claim 2, wherein at increasing distances from the center of the channel, the gas conduits have decreasing cross-sections, increasing lengths, or a combination thereof.

4. The component of claim 3, wherein the gas conduits have decreasing cross-sections at increasing distance from the center of the channel.

5. The component of claim 3, wherein the gas conduits have increasing lengths at increasing distance from the center of the channel.

6. The component of claim 3, wherein the plurality of gas conduits comprises a series of nested conduits.

7. The component of claim 3, wherein the plurality of gas conduits comprises a series of adjacent conduits.

8. The component of claim 1, wherein the one or more flow restrictors comprise at least one of a packed bed or a porous material.

9. The component of claim 8, wherein the length of the packed bed or porous material increases at increasing distance from the center of the channel.

10. The component of claim 1, wherein the one of more flow restrictors comprise a spiraled structure, the spiraled structure being configured so that (a) the cross-sectional spacing between adjacent portions of the spiraled structure decreases at increasing distance from the center of the channel, (b) the length of portions of the spiraled structure increases at increasing distance from the center of the channel, (c) or a combination thereof.

11. The component of claim 1, wherein the one or more flow restrictors are configured to provide a shielding gas exiting the component with a developed flow profile.

12. The component of claim 1, wherein the one or more flow restrictors are configured to provide a shielding gas exiting the component with a parabolic flow profile.

13. The component of claim 1, wherein the one or more flow restrictors are configured to provide a shielding gas that is converted to a developed flow profile after exiting the component.

14. The component of claim 1, wherein the one or more flow restrictors are configured to provide a shielding gas exiting the component with a constant shear flow profile.

15. The component of claim 1, wherein the one or more flow restrictors are configured to provide a shielding gas exiting the component with a flow profile that is an intermediate between a constant shear flow profile and a developed flow profile.

16. The component of claim 1, in which the channel comprises an unrestricted length downstream from the one or more flow restrictors.

17. The component of claim 1, further comprising an inner wall which separates the shielding gas channel from a central passageway.

18. A welding implement comprising the component of claim 1.

19. The welding implement of claim 18, wherein the welding implement is a gas tungsten arc welding torch.

20. The welding implement of claim 19, wherein
the component comprises a central passageway,
the gas tungsten arc welding torch comprises an electrode that is partially surrounded by a collet, and
the component is attached to the gas tungsten arc welding torch in a manner in which the central passageway of the component at least partially surrounds the collet.

21. The welding implement of claim 19, wherein the welding implement is operable to obtain a laminar shielding gas column without the attachment of a either a gas lens or a nozzle.

22. The welding implement of claim 19, wherein the torch provides a shielding gas column having laminar flow at a tungsten stick-out distance that is greater than the diameter of the gas outlet.

23. The welding implement of claim 22, wherein the torch provides a shielding gas column having laminar flow at a tungsten stick-out distance that is at least 1.5 times the diameter of the gas outlet.

24. The welding implement of claim 18, wherein the welding implement is one of a gas metal arc welding implement, a laser welding implement, and a plasma welding implement.

* * * * *